Jan. 1, 1946.   L. E. WATTEBOT   2,392,016
GAUGING APPARATUS
Filed Sept. 20, 1943   2 Sheets-Sheet 1

Inventor
Louis Eugène Wattebot
By
Ehlers, Stern & Carlberg
Attorney

Jan. 1, 1946.　　　L. E. WATTEBOT　　　2,392,016
GAUGING APPARATUS
Filed Sept. 20, 1943　　　2 Sheets-Sheet 2

Louis Eugène Wattebot Inventor
By
Attorney

Patented Jan. 1, 1946

2,392,016

UNITED STATES PATENT OFFICE 2,392,016

GAUGING APPARATUS

Louis Eugene Wattebot, Kingsbury, London, England, assignor to Solex Limited, London, England, a British company Application September 20, 1943, Serial No. 503,035
In Great Britain September 24, 1942

9 Claims. (Cl. 33—147)

This invention relates to gauging apparatus of the type which includes at least one measuring nozzle (for example two in parallel) for the flow of liquid or gaseous fluid (more particularly air) due to pressure or depression, but hereafter referred to as pressure, operating in conjunction with the part or surface to be measured, the actual measurement, errors or the like being shown on an indicating or recording means (manometer, flow meter or otherwise), and has for its object to provide improved nozzle structures for such devices, of wide range and increased accuracy.

In gauging apparatus of the type to which the invention relates, an intermediate member is located between the part to be gauged and the measuring nozzle. This intermediate member contacts with the part to be gauged and as a consequence is subject to wear (limited but of a certain amount) as is also the supporting surface for the part being gauged.

Again, in gauging apparatus of the same type, it has been suggested to provide two nozzles disposed respectively opposite the two walls or surfaces of the piece to be measured, in some cases each nozzle having adjacent thereto contact pieces so that the contact pieces can make actual contact with the surface being operated upon to bring the associated nozzle a desired minimum distance from the said surface without the nozzle actually making contact therewith, thus constituting what herein will be termed a contact nozzle. However, in this structure of the two nozzles, both being adapted to act as contact nozzles, not only is the measuring range limited but in certain circumstances difficulty may be experienced in disposing the nozzle structure in relation to the part to be measured.

According to the present invention, in gauging apparatus of the type to which the invention relates the actual nozzle structure comprises at least one contact nozzle operating in conjunction with at least one measuring nozzle, the latter being suitably located in relation to a reference surface. In this manner the advantages of the structures of the prior art are retained without the disadvantage due to the comparatively large wear of the contact surface, and also the range and adaptability over other structures of the prior art as referred to are greatly increased.

According to a further feature of the invention, at least two contact nozzles are utilised, preferably coming in axial alignment and kept pressed apart or towards each other (according to the particular nature of the gauge) by resilient means, these contact nozzles operating in conjunction with at least one measuring nozzle.

A great variety of gauges for external, internal or other measurement can be provided in accordance with the invention and preferably the gauging fluid (particularly air) can be supplied to the contact nozzle and measuring nozzle or contact nozzles and measuring nozzle or nozzles from one conduit or from branch conduits, as desired.

In accordance therewith, however, it will be well understood that although in any example there may be one or two contact nozzles, yet the wear due to such contact, even though it is as much as the wear on the contact members, has much less result on the final reading. As a consequence the life of such contact nozzles is much greater than the life of the contact members as employed in the before-mentioned British patent.

In order that the invention may be better understood, it will now be described with reference to the accompanying somewhat diagrammatic drawings, which are given by way of example only and in which.

Figure 1:
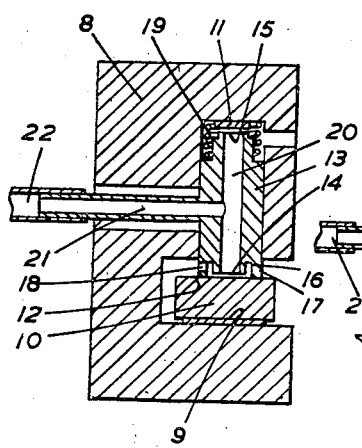
Fig. 1 is a cross-sectional elevation of a gauge of this character applied for gauging the outside dimension of a piece of work.

In accordance with a simple method of carrying the invention into effect and as shown in Fig. 1, the gauge includes a main body 8 having a surface 9 upon which the part 10 to be measured is disposed, and also a reference surface 11; between this latter and another surface 12 of the part to be measured 10 is disposed in a bore of the body 8 so as to slide, the nozzle structure 13 according to the invention. This comprises a contact nozzle 14 at one end to come into contact with the part 10 to be measured and at the other end a freely open nozzle 15, which is the measuring nozzle, to co-operate with the reference surface 11.

Dealing first with the contact nozzle 14, this comprises a recessed end 16 surrounded by an annular wall 17 the extremity of which annular wall forms the actual contact surface, the annular wall being provided with an exhaust opening 18 of desired area. In the recessed end 16 opens the contact nozzle proper 14 which comes a desired distance from the contact surface 12, for example one-half to two-thousandths of an inch, or otherwise. At the other end of the nozzle structure 13, the measuring nozzle 15 opens a desired distance from the reference surface 11 and the whole nozzle structure is kept pressed on to the workpiece by a spring 19 as shown or other resilient means could be used.

In this manner as will be well understood there is a definite and known outlet from the contact nozzle 14 and the variation of the dimension of the part 10 being measured is shown by the variation between the measuring nozzle 15 and the reference surface 11 with which it is associated. Variations of the outlet from the contact nozzle 14 are only due to wear, or error in position. They are not influenced by the variations of dimension of the part 10 being measured and remain small, and may be compensated automatically by variations in the outlet of the measuring nozzle.

In this structure, preferably the compressed fluid (air) for the contact nozzle 14 and the measuring nozzle 15 come from the same source. For example, as shown the nozzle structure 13 has a through bore 20 into which opens a conduit 21 in communication with the supply line 22.

Figure 2:
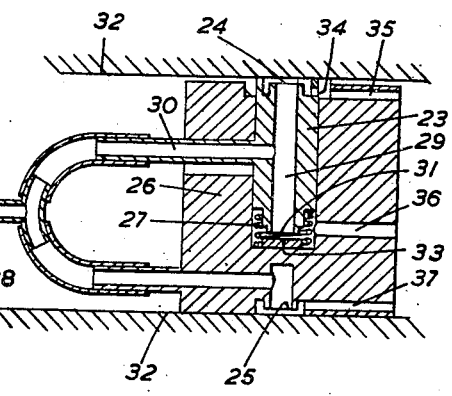
Fig. 2 is a similar cross-sectional elevation of a plug gauge.

Another method of carrying the invention into effect and for dealing with the distance between two plane surfaces such as 32 or for example for dealing with a bore or other internal dimension, is shown in Fig. 2 and includes a nozzle structure 23 and two coaxial contact nozzles 24 and 25, such as hereinbefore described in the last example. One of the contact nozzles 24 comes at one end of the structure 23 and the other 25 in the main body 26 of the gauge, in which body 26 the structure is mounted to slide. These contact nozzles 24 and 25 are kept pressed apart by spring means 27 and each is supplied from a common source 28 with the compressed fluid (air, for example). In communication with the same source 28, by a bore 29 in the structure 23 and conduit 30, there is provided a measuring nozzle 31 at the end of the bore 29 through the structure 23 remote from the contact nozzle 24 kept springily or otherwise resiliently pressed apart, for example by the spring 27, from a surface 33 carried by the main body 26 having the other contact nozzle structure 25. Variations in the rate of flow according to the dimension of the part under inspection are controlled by the distance between the nozzle 31 and the surface 33, as each contact nozzle 24, 25 is actually located at a practically constant distance from the two surfaces or internal dimension or diameter concerned. 34—35 are exhausts from the nozzle 24, 36 from the nozzle 31, and 37 from the nozzle 25.

Figure 3:
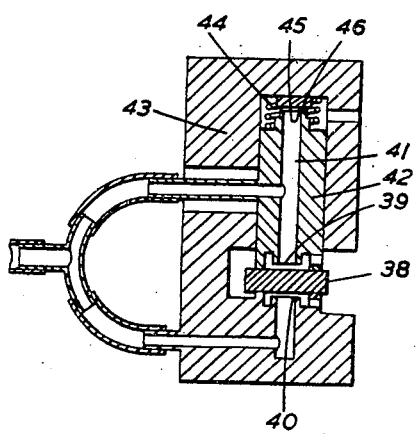
Fig. 3 is a cross-sectional elevation similar to Fig. 1 through a gauge for determining the outside dimensions of a work piece and combining some of the features of the plug gauge of Fig. 2 with the same.

In a similar manner for external dimensions on a plane part or on a circular part 38, Fig. 3, two contact nozzles 39 and 40, the first at one end of a bore 41 in a nozzle structure 42 and the second in the main gauge body 43 having a bore for the sliding of the structure 42, are kept pressed into contact with such part 38 by spring means 44, the same spring means keeping a measuring nozzle 45 spaced from a reference surface 46, the nozzle 45 coming at the end of the bore 41 remote from the nozzle 39, variation of the rate of flow from such measuring nozzle 45, in function of the dimension of 38, giving the indication on a manometer or the like.

Figure 4:
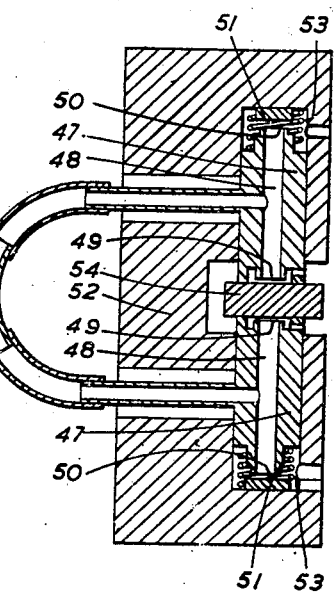
Fig. 4 is a cross-sectional elevation through a gauge with a pair of work contacting members for determining the outside dimension of a work piece against which the contact members are urged.

The form shown in Fig. 4 is somewhat similar to that shown in Fig. 3 but comprises two axially aligned nozzle structures 47 each with a bore 48 terminating at one end in a contact nozzle 49 and at the other in a measuring nozzle 50, the latter co-operating with a reference surface 51 in the main gauge body 52. Springs 53 keep the structures 47 pressed into contact with the part 54 to be measured. One spring 53 is comparatively weak and its nozzle structure 47 also has an associated abutment so that its measuring nozzle is held at least a minimum distance from its reference surface 51.

As will be appreciated and seen from the drawings, in the last two examples the main air or other compressed fluid supply is from one source and branched.

Figure 5:
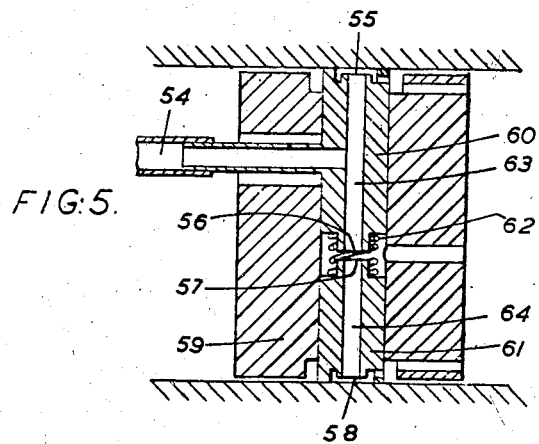
Fig. 5 is a cross-sectional elevation through a plug gauge with a pair of work contacting members forced against the wall of the bore or the like to be dimensioned.

However, there now will be described, more particularly concerned with the last example and as shown in Fig. 5, a structure where the main air supply 54 comes to one contact nozzle 55 and from a measuring nozzle 56 and from this latter passes over to another equivalent measuring nozzle 57 and thence to another contact nozzle 58.

In this structure, 59 is the main body of the gauge having a bore therethrough for the sliding of two nozzle structures 60 and 61 kept pressed apart by a spring 62. The structure 60 has a bore 63 with which the supply 54 communicates, one end of the bore terminating in the contact nozzle 55 and the other in the measuring nozzle 56. The other structure 61 has a through bore 64, one end terminating in the contact nozzle 58 and the other in the measuring nozzle 57. This latter is spaced from the measuring nozzle 56 and the bore 64 receives its air supply from the bore 63.

It will be understood that on the supply of the main pressure fluid it passes to both contact nozzles 55 and 58 and the measure of its escape through the gap between the two measuring nozzles 56 and 57 is reproduced on the manometer, flow meter or otherwise.

Figure 6:
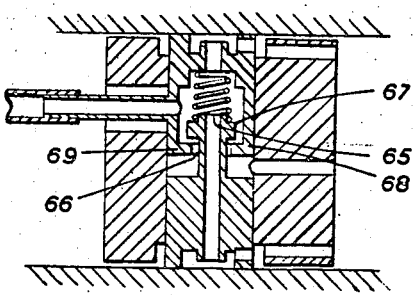
Fig. 6 is a similar plug gauge in cross-sectional elevation, with a slightly modified measuring gap, and Fig. 7 also is a cross-sectional elevation through a plug gauge, similar to Fig. 6, with one work contacting member telescoped into the other.

As a variation of the example given in Fig. 5, and as shown in Fig. 6, in place of definitely aligning two measuring nozzles 65 and 66, one (65) is externally flanged at 67 and enters the body 68 of the other (66) which is internally flanged at 69, the measure of the escape of air between the external and internal flanges 67 and 69 being reproduced on the manometer or the like. The remainder of the structure shown in Fig. 6 is not described as it is thought to be sufficiently clear from that which precedes and from the drawing.

Figure 7:
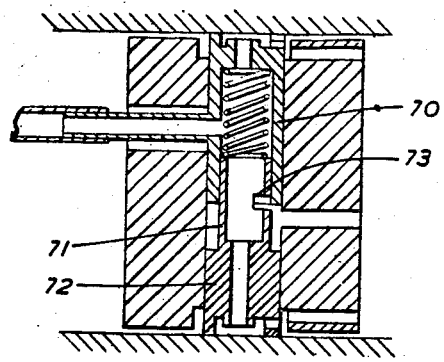

Fig. 7 shows a further variation of the structures shown in Figs. 5 and 6. In this figure also the two measuring nozzles are made in accordance with my co-pending application Serial No. 477,543 dated March 1, 1943, where only a part of the total perimeter of the nozzles is utilised as a factor of the area for the flow of the measuring air.

Briefly, the portion of the structure of Fig. 7 not shown or described in the previous forms, comprises a bored body 70 to one of the aligned nozzle structures into the open end of which telescopically fits and slides the inner end 71 of the bored body 72 of the other nozzle structure.

Within the range of action of the gauge this inner end 71 has a slot 73 of desired axial and circumferential extent. It will be understood that the uncovered area at any time of this slot 73 is the passage for the escaping air to give the measurement desired.

Although gauges in accordance with the invention have many advantages, particularly it may be observed that it makes it possible to increase the range of such gauges as the limitations of the measuring nozzle differ greatly from the limitations, for example, of a contact nozzle.

Another advantage is the possibility of compressing or expanding the gauge, according to its particular nature. For example, a gauge for a bore can be compressed for insertion into the bore, which eases the introduction, and it then can be allowed to expand without imposing any error on the readings. More particularly, in some forms the compressibility can be so great that it is possible to introduce the gauge into bores of smaller dimensions than the diameter to be measured, thus permitting the measurement of the diameter of internal grooves or otherwise.

The examples of carrying the invention into effect given herein are few of the many that might be chosen and it should be well understood that the invention is not limited to the precise details of construction or to the particular constructions described as these obviously may be varied within wide limits and more particularly according to the exact application of the gauge, or the functions which the gauge is to assume.

What I claim and desire to secure by Letters Patent of the United States of America is:

1. In a device of the character described, the combination of a body member, a work contacting member movable within and relatively to the body member and provided at one end with a work engaging surface surrounding a cavity in the work contacting member, and having an exhaust opening between said cavity and the atmosphere, means in the interior of the body member for moving the contacting members to operative position and maintaining a variable gap between the opposite end of the contacting member and an opposing surface, the size of the gap depending on the relative position of the work engaging surface of the contacting member and the body member, the gap being in communication with a measuring passage adapted for communication with a pressure fluid meter, and means for supplying the interior of the work contacting member with a fluid at a pressure different from atmospheric pressure, the interior of the work contacting member being in communication with said cavity and said gap.

2. In a device of the character described, the combination of a body member, a work contacting member movable within and relatively to the body member and provided at one end with a work engaging surface surrounding a cavity in the work contacting member, and having an exhaust opening between said cavity and the atmosphere, means in the interior of the body member for moving the contacting member to operative position and maintaining a variable gap in the interior of the body member, between the opposite end of the contacting member and an opposing surface, the size of the gap depending on the relative position of the work engaging surface of the contacting member and the body member, the gap being in communication with a measuring passage adapted for communication with a pressure fluid meter, and means for supplying the interior of the work contacting member with a fluid at a pressure different from atmospheric pressure, the interior of the work contacting member being in communication with said cavity and said gap.

3. In a device of the character described, the combination of a body member, a work contacting member movable within and relatively to the body member and provided at one end with a work engaging surface surrounding a cavity in the work contacting member, and having an exhaust opening between said cavity and the atmosphere, means in the interior of the body member for yieldingly urging the contacting member to move in a predetermined direction relatively to the body member and for maintaining a variable gap between the opposite end of the contacting member and an opposing surface, the size of the gap depending on the relative position of the work engaging surface of the contacting member and the body member, the gap being in communication with a measuring passage adapted for communication with a pressure fluid meter, and means for supplying the interior of the work contacting member with a fluid at a pressure different from atmospheric pressure, the interior of the work contacting member being in communication with said cavity and said gap.

4. In a device of the character described, the combination of a body member, a work contacting member movable within the body member and provided at one end with a work engaging surface surrounding a cavity in the work contacting member, and having an exhaust opening between the cavity and the atmosphere, means in the interior of the body member for moving the contacting member against the work to be gauged and for maintaining a variable gap spaced in the interior of the body member from the contacting surface between the opposite end of the contacting member and an opposing surface in the interior of the body member, the gap being in communication with a measuring passage, and means for supplying the interior of the work contacting member at any position relatively to the body member with a pressure fluid, the interior of the work contacting member being in communication with said cavity and said gap.

5. In a device of the character described, the combination of a body member, a work contacting member movable in the interior of the same and provided at one end with a work engaging surface having a recess, and having an exhaust opening between said recess and the atmosphere, means in the interior of the body member for yieldingly urging the work contacting member to operative position and for maintaining a variable gap between the opposite end of the contacting member and an opposing surface, the gap being in communication with a measuring passage extending through the body member and adapted for communication with a pressure fluid meter, and means for supplying the interior of the work contacting member through the body member with a pressure fluid, the interior of the work contacting member being in communication with said recess and said gap.

6. In a device of the character described, the combination of a body member, work contacting members movable within the body member, each provided with a work engaging surface at one end, said surfaces each having a recess from which an exhaust opening leads through said contacting member to the atmosphere, means in the interior of the body member for moving the work contacting members in opposite directions to engagement with the work at their recessed ends, and for maintaining a variable gap between the opposite ends and an opposing surface respectively, the gap being in communication with a pressure fluid meter, and means for supplying simultaneously the interiors of the work contacting members with the same pressure fluid, the interior of each work contacting member being in communication with said recesses and said gap.

7. In a device of the character described, the combination of a body member, a pair of work contacting members movable within and relatively to the body member in a rectilinearly alined path, each work contacting member having at the outer end a work engaging surface surrounding a cavity in said work contacting member and having an exhaust opening between said cavity and said atmosphere, means in the interior of the body member for moving the contacting members in opposite directions outwardly and for maintaining a variable gap between portions of said work contacting members, the body member being provided with a passage in communication with the gap and adapted for communication with a pressure fluid meter, and means for supplying the interior of both work contacting members in any of their relative positions with a pressure fluid, the interior of each work contacting member being in communication with said gap and with the recess in the work contacting surface at its opposite end.

8. In a device of the character described, the combination of a body member, a pair of work contacting members movable within the body member in a rectilinear path and provided each at one end with a work engaging surface surrounding a cavity and having an exhaust opening extending from said cavity, the body member having passages in communication with said exhaust openings, means in the interior of the body member for yieldingly forcing the work contacting members away from each other and into engagement with the work to be gauged at their work contacting surfaces, and for maintaining a variable gap between other portions of said work contacting members, the gap being in communication with a measuring passage extending through the body member, and adapted for communication with a pressure fluid meter, and means for supplying the interiors of both work contacting members with a pressure fluid, the interior of each work contacting member being in communication with said recess and said gap.

9. In a device of the character described, the combination of a body member, a pair of work contacting members movable within the body member, and each provided with a bore, the bores in the work contacting members being in axial alinement with each other regardless of the relative position of the contacting members and the body member, means between said work contacting members in the interior of the body for moving the contacting members to operative position and for maintaining a variable gap between predetermined portions of said work contacting members in the interior of the body member, the work contacting members having at their outer ends work contacting surfaces each provided with a recess from which an exhaust opening extends through said work contacting member, the body member having openings in communication with said exhaust opening and in communication with said gap respectively, said last named opening being adapted for connection with a pressure fluid meter, and means for supplying the interior of the work contacting members with a pressure fluid, the bore in each work contacting member being in communication with said gap with the recess in the work contacting surface and with the fluid pressure supply.

LOUIS EUGENE WATTEBOT.